US009269970B2

(12) United States Patent
Chen et al.

(10) Patent No.: US 9,269,970 B2
(45) Date of Patent: Feb. 23, 2016

(54) FUEL CELL SYSTEM AND METHOD OF HEAT RECOVERY THEREOF

(71) Applicant: National Chiao Tung University, Hsinchu (TW)

(72) Inventors: Tsung-Lin Chen, Taipei (TW); Chien-Chang Wu, Changhua County (TW)

(73) Assignee: National Chiao Tung University (TW)

( * ) Notice: Subject to any disclaimer, the term of this patent is extended or adjusted under 35 U.S.C. 154(b) by 261 days.

(21) Appl. No.: 13/912,353

(22) Filed: Jun. 7, 2013

(65) Prior Publication Data

US 2014/0178781 A1    Jun. 26, 2014

(30) Foreign Application Priority Data

Dec. 26, 2012  (TW) .............................. 101150022 A

(51) Int. Cl.
*H01M 8/04* (2006.01)
*H01M 8/06* (2006.01)
*H01M 8/12* (2006.01)

(52) U.S. Cl.
CPC ...... *H01M 8/04074* (2013.01); *H01M 8/04014* (2013.01); *H01M 8/0618* (2013.01); *H01M 8/0662* (2013.01); *H01M 2008/1293* (2013.01); *Y02E 60/50* (2013.01)

(58) Field of Classification Search
USPC .......................................... 429/433, 434, 440
See application file for complete search history.

(56) References Cited

U.S. PATENT DOCUMENTS 4,670,359 A * 6/1987 Beshty et al. .................. 429/424
6,608,463 B1 * 8/2003 Kelly et al. .................... 320/101

OTHER PUBLICATIONS

C. C. Wu et al., "A Conceptual Design of Small-Scale Low-Temperature SOFC-CHP system" , 2012 Taiwan Symposium on Carbon Dioxide Capture, Storage and Utilization, NSC Project No. 101-3113-P-009-002-, Nov. 25, 2012, Taiwan.

* cited by examiner

*Primary Examiner* — Patrick Ryan
*Assistant Examiner* — Julian Anthony
(74) *Attorney, Agent, or Firm* — Bacon & Thomas, PLLC

(57) ABSTRACT

The present invention provides a fuel cell system, and the fuel cell system comprises a fuel cell, an after burner, a heat exchanger and a reformer. The after burner connects with the fuel cell to receive rest-bar of the fuel cell and produce a gas with high temperature. The heat exchanger comprises a first heat exchanging unit and a second heat exchanging unit connected with the first heat exchanging unit, and the second heat exchanging unit connects with a fuel input pipe for receiving the fuel. The reformer connects with the after burner, the first heat exchanging unit and the second heat exchanging unit separately.

5 Claims, 4 Drawing Sheets

FUEL CELL SYSTEM AND METHOD OF HEAT RECOVERY THEREOF

BACKGROUND OF THE INVENTION

1. Field of the Invention

The present invention relates to a fuel cell system, particularly to a fuel cell system to recover the high temperature gas from the after burner to the reformer for increasing the heat efficiency and the method of heat recovery thereof.

2. Description of the Prior Art

Because the energy price soars continuously at present, thus, how to solve the energy problem is become the attention focus of every country, wherein the best way is to raise the energy efficiency.

The fuel cell is an apparatus to convert the chemical energy into the electric energy through the electrochemical reaction. Its working principle is to transport the hydrogen-containing fuel and the oxide (air or oxygen) to the anode and the cathode of cell, separately. The anode decomposes the fuel into the hydrogen ion and the electron. The hydrogen ion passes through the proton exchange membrane from the anode to the cathode, which reacts with the electron transmitted from the outside circuit into water at the cathode. If the fuel is supplied continuously, the fuel cell will be able to generate the power. Because the reaction product of fuel cell is water, thus there is no environmental pollution. The development of this technology has been paid widely attention due to its high efficiency and low pollution.

Please referring to FIG. 1, which shows a structure plot of the conventional fuel cell system 100. The preferred one is the solid oxide fuel cell combined heat and power (SOFC-CHP), but it is not limited to this. The abovementioned system 100 comprises a solid oxide fuel cell 10 to generate the electric energy by chemical reaction, a reformer 11 to reform the fuel to hydrogen rich gas, a first heat exchanging unit 12, a second heat exchanging unit 13 and an after burner 14. In addition, the first heat exchanging unit 12 comprises a methane input part 12a, a methane output part 12b, an exhaust gas input part 12d and an exhaust gas output part 12c connected with the after burner 14. The second heat exchanging unit 13 comprises an exhaust gas input part 13a connected with the exhaust gas output part 12c of the first heat exchanging unit 12, an exhaust gas output part 13b, an air input part 13c and an air output part 13d. The reformer 11 comprises a methane input part 11a. connected with the methane output part 12b of the first heat exchanging unit, a hydrogen rich gas output part 11b connected with the fuel cell and a water input part 11c.

Basically, the electrochemical reaction of fuel cell system 100 is an exothermic reaction. The reforming reaction for generating the hydrogen from methane is an endothermic reaction. Therefore, the main function of the after burner 14 is to convert the unreacted gas and fuel in fuel cell 10 and reformer 11 into heat energy and output it to the first heat exchanging unit 12. The first heat exchanging unit 12 and the second heat exchanging unit 13 can further use the recovered heat energy to orderly heat methane and air. The heated methane is able to assure the reforming reaction at suitable temperature, in order to achieve sufficient efficacy of raising efficiency and conserving energy.

However, there are some limitations in applying the conventional scheme, such as:

(1) The working temperature of reformer 11 is between 400° C. and 700° C. If there is no external energy for the reforming reaction, the energy required by endothermic reaction should be provided by methane and water vapor completely. Thus, it is estimated that the exit gas temperature of after burner 14 should be as high as 1750° C. to assure the reforming reaction in the range of its working temperature. However, the high-temperature heat exchanging unit will be required for the high-temperature gas, which will be unfavorable to the operation life and price of system.

(2) The gas temperature for the anode and gas temperature for the cathode of fuel cell 10 should be close (temperature difference should be less than 150° C.), otherwise the cell pile will break because of heat stress. However, in the abovementioned scheme, because the heat exchanging mechanism is too simple, it is necessary to use accurate systematic parameter and design to close the abovementioned temperature.

(3) In the abovementioned scheme, only a little part of recovered waste heat that used for heating the methane and air, most waste heat is used for other uses, such as providing the hot water or hot gas. However, the demand of hot water/hot gas is not high in the subtropical area, thus the abovementioned scheme is not suitable for the subtropical area.

SUMMARY OF THE INVENTION

Inasmuch as the drawbacks of the abovementioned conventional technology, the present invention provides a fuel cell system, and the fuel cell system comprises a fuel cell, an after burner, a heat exchanger and a reformer. The after burner connects with the fuel cell to receive rest-bar of the fuel cell and produce a gas with high temperature. The heat exchanger comprises a first heat exchanging unit, and a second heat exchanging unit connected with the first heat exchanging unit, and the second heat exchanging unit connects with a fuel input pipe for receiving the fuel. The reformer connects with the after burner, the first heat exchanging unit and the second heat exchanging unit separately. And then, the gas with high temperature is orderly delivered to the reformer, the first heat exchanging unit and the second heat exchanging unit. A gas with high temperature is provided to the reformer, and then the reformer can reform the output fuel of the second heat exchanging unit as the necessary heat of the hydrogen-rich gas.

In an embodiment of the present invention, the heat exchanger further comprises a third heat exchanging unit connected with the second heat exchanging unit and a water input pipe, in order to process the heat exchange between the water and the gas with high temperature outputted from the second heat exchanging unit through heat exchange, and then outputted to the reformer.

In an embodiment of the present invention, the first heat exchanging unit connects with an air input pipe, and conducts heat exchange with air through the gas with high temperature outputted from the reformer. In an embodiment of the present invention, the heat exchanger further comprises a fourth heat exchanging unit, and the fourth heat exchanging unit connects with the reformer, the first heat exchanging unit and the fuel cell to conduct heat exchange for the hydrogen rich gas outputted from the reformer and the air outputted from the first heat exchanging unit.

In an embodiment of the present invention, the fuel cell system provided by the present invention further comprises another air input pipe connected with the after combustion chamber to input the air with room temperature to the after burner.

In an embodiment of the present invention, the fuel cell system provided by the present invention is a solid oxide fuel cell system.

Another purpose of the present invention is to provide a heat recovery method of the fuel cell system. The abovementioned method comprises the following steps: Firstly, constructing the abovementioned fuel cell system. Next, delivering the gas with high temperature to the reformer is carried out, in order to provide heat energy for reforming the fuel to hydrogen rich gas. Then, delivering the gas with high temperature from the reformer to the first heat exchanging unit, and delivering the gas with high temperature from the first heat exchanging unit to the second heat exchanging unit for conducting heat exchange with fuel.

In an embodiment of the present invention, the heat exchanger further comprises a third heat exchanging unit connected with the second heat exchanging unit and a water input pipe. The abovementioned heat recovery method further comprises the following steps: Firstly, delivering the gas with high temperature from the second heat exchanging unit to the third heat exchanging unit. Then, conducting heat exchange with water through the gas with high temperature, and outputting the water to the reformer.

In an embodiment of the present invention, the first heat exchanging unit connects with an air input pipe to input air. The heat exchanger further comprises a fourth heat exchanging unit. The fourth heat exchanging unit connects with the reformer, the first heat exchanging unit and the fuel cell. The abovementioned heat recovery method further comprises the following steps: Firstly, conducting heat exchange for the hydrogen rich gas outputted from the reformer and the air outputted from the first heat exchanging unit. Then, outputting the hydrogen rich gas and air to the fuel cell is carried out.

In an embodiment of the present invention, the fuel cell system further comprises another air input pipe connected with the after burner. The abovementioned heat recovery method further comprises the following step: inputting the air with room temperature to the after burner.

Therefore, the advantage and spirit of the present invention can be understood further by the following detail description of invention and attached Figures.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
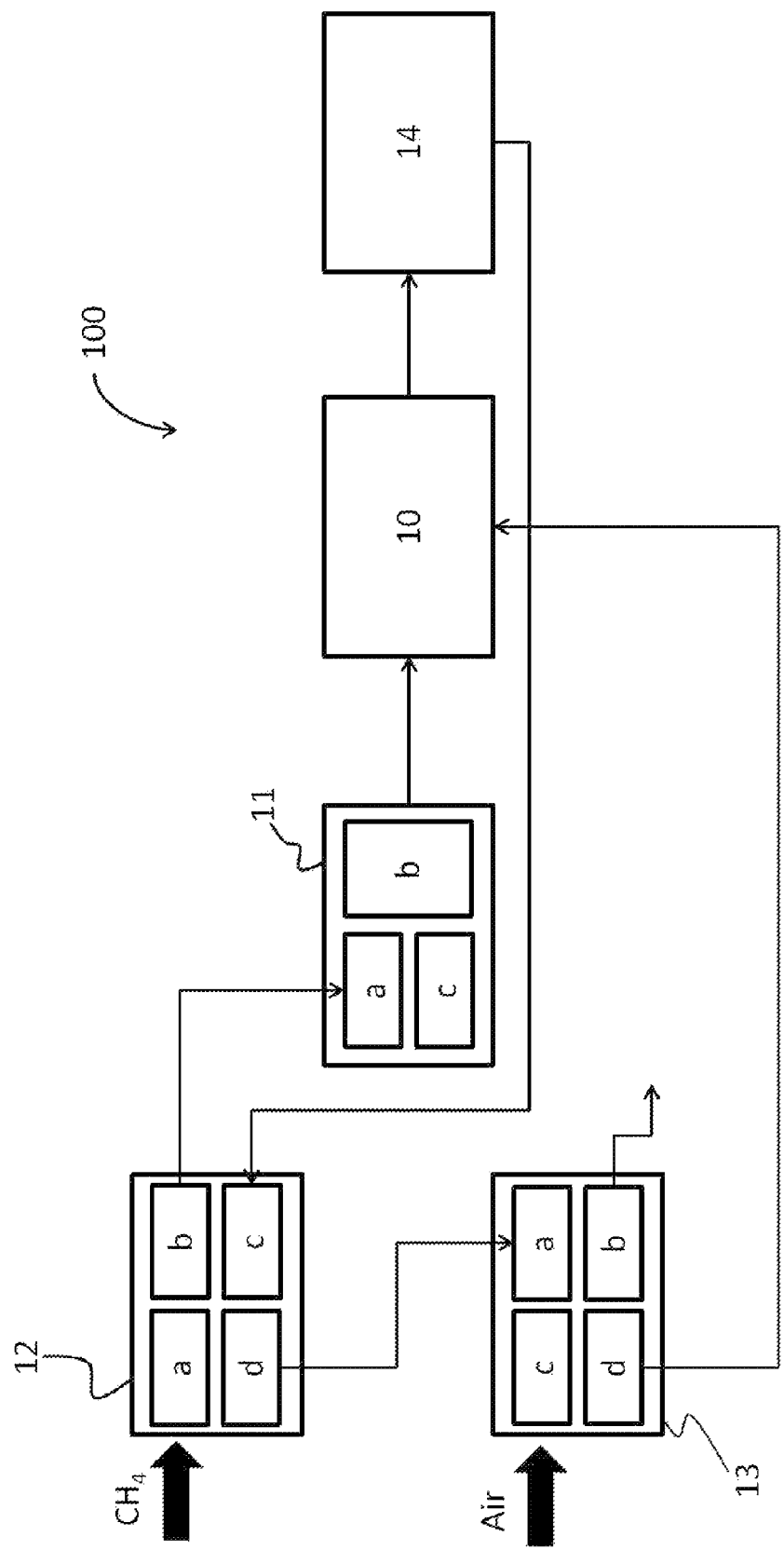
FIG. 1 shows a structure plot of the conventional fuel cell system.
Figure 2:
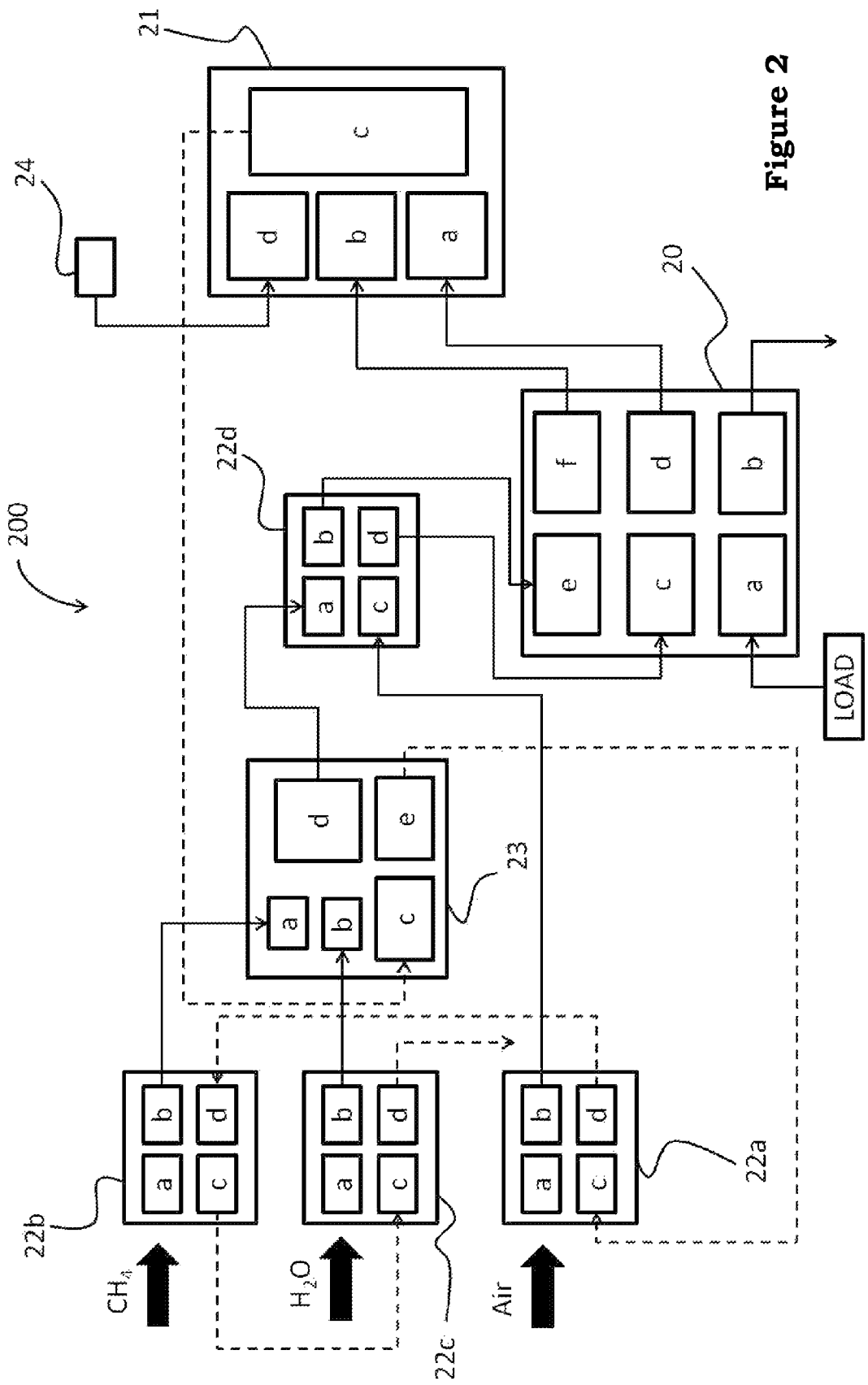
FIG. 2 shows a structure plot of a preferred embodiment of the fuel cell system according to the present invention.

Please referring to FIG. 2, which shows a structure plot of a preferred embodiment of the fuel cell system according to the present invention. As shown in FIG. 2, the present invention provides a fuel cell system 200, and the fuel cell system comprises a fuel cell 20, an after burner 21, a heat exchanger 22 not shown in figure, including first heat exchanging unit 22a, second heat exchanging unit 22b, third heat exchanging unit 22c, fourth heat exchanging unit 22d and a reformer 23. Preferably, the fuel cell system 200 provided by the present invention is a solid oxide fuel cell system, and the fuel cell connects with a load, but the present invention is not limited to this.

As shown in FIG. 2, the after burner 21 connects with the fuel cell 20 to receive rest-bar of the fuel cell 20 and produce a gas with high temperature. The heat exchanger 22 comprises a first heat exchanging unit 22a, and a second heat exchanging unit 22b connected with the first heat exchanging unit 22a. The first heat exchanging unit 22a connects with an air input pipe A for receiving the air, and the second heat exchanging unit 22b connects with a fuel input pipe F for receiving the fuel. The reformer 23 connects with the after burner 21, the first heat exchanging unit 22a and the second heat exchanging unit 22b separately. And then, the gas with high temperature is orderly delivered to the reformer 23, the first heat exchanging unit 22a and the second heat exchanging unit 22b. A gas with high temperature is provided to the reformer 23, and then the reformer 23 can reform the output fuel of the second heat exchanging unit 22b as the necessary heat of the hydrogen-rich gas.

Preferably, in FIG. 2, the heat exchanger 22 further comprises a third heat exchanging unit 22c and a fourth heat exchanging unit 22d. The third heat exchanging unit 22c connects with the second heat exchanging unit 22b and a water input pipe W, in order to process the heat exchange between the water and the gas with high temperature outputted from the second heat exchanging unit 22b through heat exchange, and then outputted to the reformer 23. In addition, the fourth heat exchanging unit 22d connects with the reformer 23, the first heat exchanging unit 22a and the fuel cell 20, in order to conduct heat exchange for the hydrogen rich gas outputted from the reformer 23 and the air outputted from the first heat exchanging unit 22a.

In detail, in FIG. 2, the solid line and arrow describe the operation path of the fuel cell system 200. As for the first heat exchanging unit 22a, the first heat exchanging unit 22a connects with the air input pipe A for the air to enter through its air input part 22aa, and then delivered to the fourth heat exchanging unit 22d through its air output part 22ab. Then, as for second heat exchanging unit 22b, the second heat exchanging unit connects with the fuel input pipe for the fuel to enter through its fuel input part 22ba, and then delivered to the reformer 23 through its fuel output part 22bb. Then, the third heat exchanging unit 22c connects with the water input pipe for the water to be delivered to the reformer 23 through its water input part 22ca and its water output part 22cb.

Furthermore, in FIG. 2, the reformer 23 receives the fuel and water from the fuel input part 23a and water input part 23b for conducting a reforming reaction to generate the hydrogen rich gas, and outputted to the fourth heat exchanging unit 22d through the gas output part 23d. It is noted. that the main purpose of the fourth heat exchanging unit 22d is to conduct heat exchange for the gas entering into the anode input part 20e and the cathode input part 20c of fuel cell 20, and control the temperature of fuel cell 20 by the temperature of gas entering into the fuel cell 20.

Then, in FIG. 2, the dashed line and arrow describe the heat recovery path of fuel cell system 200. The main purpose of the present invention is to deliver the gas with high temperature from the gas output part 21c of the after burner 21 to the gas input part 23c of the reformer 23, in order to provide the heat energy required for the reforming reaction of the reformer 23.

Then, in FIG. 2, the residual waste heat will be delivered to the gas input part 22ac of the first heat exchanging unit 22a through another gas output part 23e. At this time, the residual waste heat of the gas with high temperature will conduct heat exchange for the air in the first heat exchanging unit 22a.

Then, the rest residual waste heat will be delivered to the second heat exchanging unit 22b from the gas output part 22ad of the first heat exchanging unit 22a to conduct heat exchange for the water in the second heat exchanging unit 22b. Finally, the residual waste heat will be delivered to the third heat exchanging unit 22c to conduct heat exchange for the fuel (preferably methane).

In addition, in the preferred embodiment of FIG. 2, the fuel cell system 200 provided by the present invention further comprises an air input pipe 24, and the air input pipe 24 connects with the air input part 24d of the after combustion chamber 21 for delivering the air with room temperature to the after burner 21, in order to control the temperature of fuel cell system 200.

Meantime, in FIG. 2, the fuel cell system 200 of the present invention is able to provide different electric energy by controlling the flow rate of methane and the temperature of the fuel cell 20.

Figure 3:
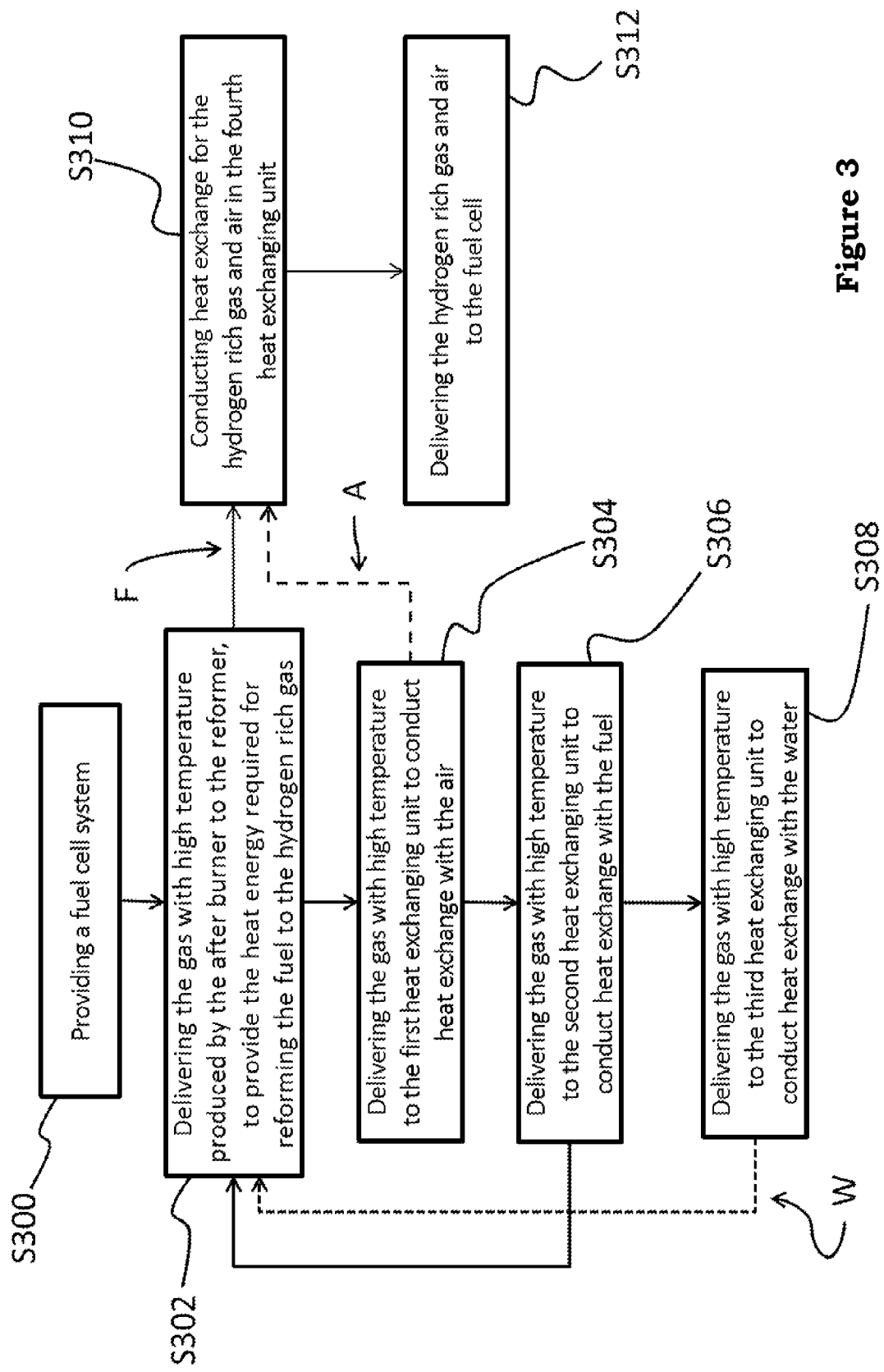
FIG. 3 shows the heat recovery method for a preferred embodiment of the fuel cell system according to the present invention.

As shown in FIG. 3, the fuel cell system 200 provided by the present invention is illustrated. The heat recovery method for the fuel cell system of the present invention comprises the following steps: First, in Step S300, the present invention provides a fuel cell system 200, the scheme of this system has been described as above without further description. Then, the gas with high temperature is delivered to the reformer to provide the heat energy required for reforming the fuel to the hydrogen rich gas, as shown in Step S302. Then, the gas with high temperature from the reformer is orderly delivered to the first heat exchanging unit (Step S304), the second heat exchanging unit (Step S306), and the third heat exchanging unit (Step S308) to conduct heat exchange for the air, water, and fuel, respectively.

As shown in FIG. 3, before the hydrogen rich gas and air enter into the fuel cell in Step S312, conduct heat exchange for these two gases in the fourth heat exchanging unit, as shown in Step S310. It is noted that the heat recovery method provided by the present invention is a best embodiment. The main purpose is to conduct heat exchange for the reformer in priority by the gas with high temperature produced by the after burner, and the order of other steps is not limited in this preferred embodiment.

Figure 4:
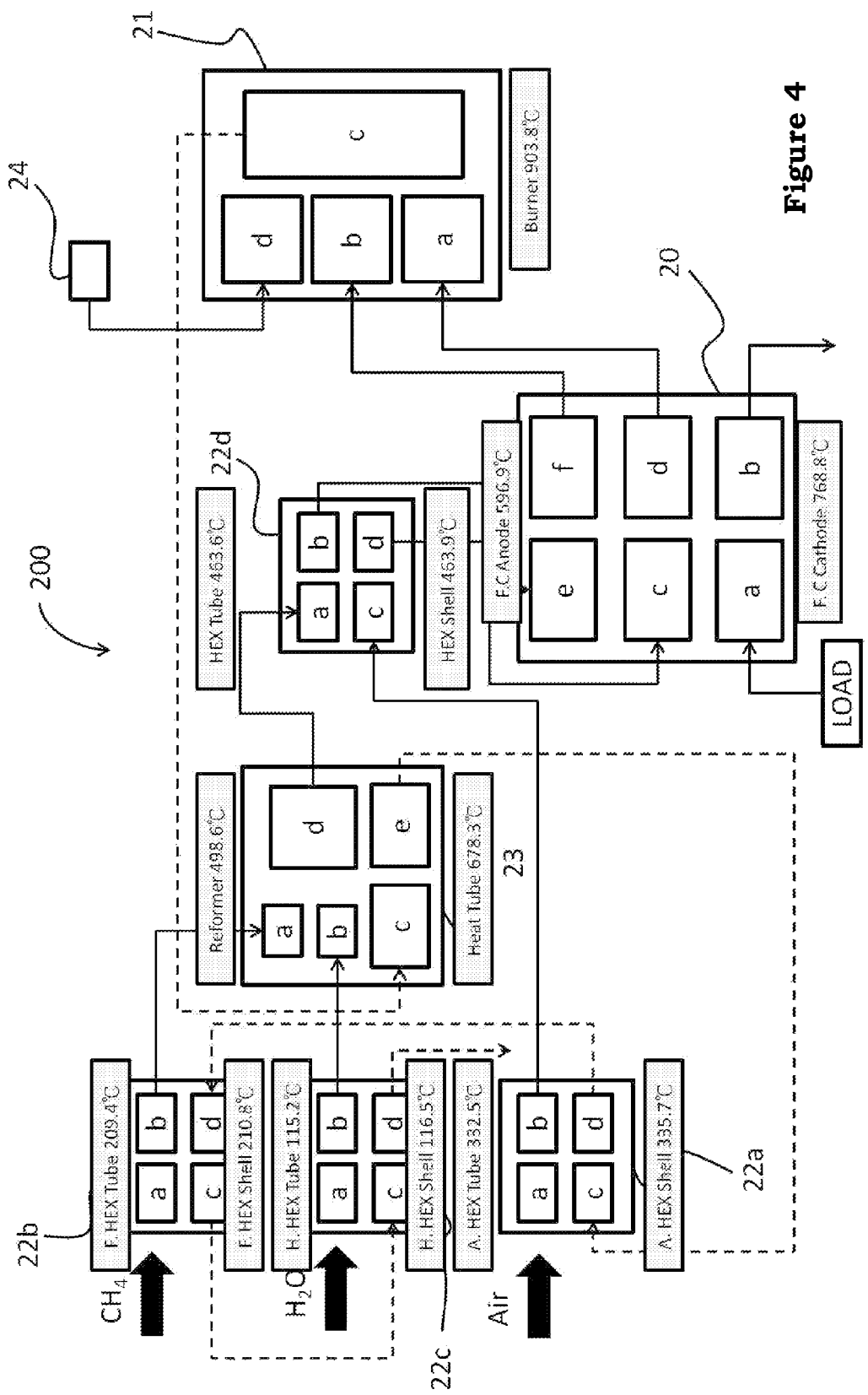
FIG. 4 shows the temperature distribution for a preferred embodiment of the fuel cell system according to the present invention.

Please referring to FIG. 4, which shows the temperature distribution for a preferred embodiment of the fuel cell system according to the present invention. It is the simulation result for a 5 kW electric energy output of the abovementioned system. As shown in FIG. 4, the operation temperature of the fuel cell 20 is about 700° C., and the reaction temperature of the reformer 23 is about 500° C., which is in its working range actually. The gas output temperature (the maximum temperature of system) of the after burner 21 is 900° C., which highly reduces the requirement for the material of system component (such as high-temperature heat exchanging unit). In addition, the temperature for the anode gas inlet 20e of fuel cell 20 is 463.6° C., and the temperature of the cathode gas inlet 20c is 463.9° C., both temperatures are almost the same. The final discharged waste heat temperature is 116° C., which shows most of waste heat is used to assist the electrochemical reaction of fuel cell to produce the electric energy through heat exchange.

In summary, the present invention provides a fuel cell system and method of heat recovery thereof. The gas with high temperature outputted from the after burner of this fuel cell system conducts heat exchange with the reformer first, in order to provide the heat required by the reforming reaction. The residual waste heat conducts heat exchange with the air. The rest waste heat conducts heat exchange with the methane and the water. In addition, the gas from the reforming reaction conducts heat exchange with the heated air. The advantages of this novel scheme are described as follows:

(1) The fuel cell system provided by the present invention adopts the waste heat of gas with high temperature produced by the after burner to raise the electric energy of fuel cell, which will be beneficial to the user with higher electric energy requirement than heat energy requirement;

(2) The waste heat produced by the after burner conducts heat exchange with the reformer first, which can raise the gas temperature after reforming reaction;

(3) The heat exchange of reformer and the heat exchange of fuel gas are conducted independently, which can control the temperature of reforming reaction precisely, and reduce the requirement for the gas temperature of after burner;

(4) The heat exchange is conducted again for the gas of anode input part and cathode input part of fuel cell, in order to assure close temperature at the cathode and anode of fuel cell to reduce the complexity of system temperature control;

(5) The gas entering into the fuel cell is used to control the temperature of fuel cell, to reduce the complexity of temperature control; and (6) The extra air input of the after burner is used to control the temperature of fuel cell system.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A solid oxide fuel cell system, comprising:
a fuel cell;
an after burner means for receiving a rest-bar of the fuel cell and producing a gas with high temperature, the after burner connecting with the fuel cell;
a fuel input pipe;
a water input pipe;
an air input pipe, wherein the air input pipe is connected with an after combustion chamber to input an air with a room temperature to the after burner;
a first heat exchanging unit, wherein the first heat exchanging unit is connected with an air input pipe to conduct heat exchange with air through the gas with high temperature outputted from the reformer;
a second heat exchanging unit, the second heat exchanging unit is connected with the first heat exchanging unit, and the second heat exchanging unit connecting with the fuel input pipe for receiving the fuel; and
a reformer, the reformer connecting with the after burner, the first heat exchanging unit and the second heat exchanging unit separately;
a third heat exchanging unit, the third heat exchanging unit is connected with the second heat exchanging unit and the water input pipe, in order to process the heat exchange between the water and the gas with the high temperature outputted from the second heat exchanging unit, and outputs the gas with high temperature to the reformer;
a fourth heat exchanging unit, the fourth heat exchanging unit is connected with the reformer, the first heat exchanging unit and the fuel cell to conduct heat exchange for a hydrogen rich gas outputted from the reformer and the air outputted from the first heat exchanging unit;

wherein the gas with high temperature being orderly delivered to the reformer, the the first heat exchanging unit and the second heat exchanging unit, the gas with high temperature being provided to the reformer, so that the reformer being able to reform an an output fuel of the second heat exchanging unit as a necessary heat of a hydrogen-rich gas.

2. A heat recovery method of the solid oxide fuel cell system according to claim 1, comprising:

providing a solid oxide fuel cell system, comprising
a fuel cell;
an after burner, the after burner connecting with the fuel cell to receive a rest-bar of the fuel cell and produce a gas with high temperature;
a first heat exchanging unit:
a second heat exchanging unit connected with the first heat exchanging unit, and the second heat exchanging unit connecting with a fuel input pipe for receiving a fuel;
a third heat exchanging unit, the third heat exchanging unit is connected with the second heat exchanging unit and the water input pipe, in order to process the heat exchange between the water and the gas with the high temperature outputted from the second heat exchanging unit, and outputs the gas with high temperature to the reformer;
a fourth heat exchanging unit, the fourth heat exchanging unit is connected with the reformer, the first heat exchanging unit and the fuel cell to conduct heat exchange for a hydrogen rich gas outputted from the reformer and the air outputted from the first heat exchanging unit; and
a reformer, the reformer connecting with the after burner, the first heat exchanging unit and the second heat exchanging unit separately;
delivering the gas with high temperature to the reformer in order to provide a heat energy required for reforming the fuel to a hydrogen rich gas;
delivering the gas with high temperature to the first heat exchanging unit; and
delivering the gas with high temperature to the second heat exchanging unit from the first heat exchanging unit to conduct a heat exchange for the fuel.

3. The heat recovery method according to claim 2, wherein the heat exchanger further comprises a third heat exchanging unit, the third heat exchanging unit connects with the second heat exchanging unit and a water input pipe, the heat recovery method further comprises the following steps:

delivering the gas with high temperature to the third heat exchanging unit from the second heat exchanging unit;
conducting heat exchange with the water through the gas with high temperature; and
delivering the water to the reformer.

4. The heat recovery method according to claim 2, wherein the first heat exchanging unit connect with an air input pipe to input air, the heat exchanger further comprises a fourth heat exchanging unit, the fourth heat exchanging unit connecting with the reformer, the first heat exchanging unit and the fuel cell, the heat recovery method further comprises:

conducting a heat exchange for a hydrogen rich gas outputted from the reformer and the air outputted from the first heat exchanging unit; and
outputting a hydrogen rich gas and an air to the fuel cell.

5. The heat recovery method according to claim 2, wherein the fuel cell system further comprises another air input pipe connected with the after burner, the heat recovery method further comprises:

inputting the air with room temperature to the after burner.

* * * * *